(12) United States Patent
Ohto

(10) Patent No.: US 7,752,655 B2
(45) Date of Patent: Jul. 6, 2010

(54) ACCESS CONTROL DEVICE AND ELECTRONIC DEVICE

(75) Inventor: Hidetaka Ohto, Hyogo (JP)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 11/547,266

(22) PCT Filed: Apr. 12, 2005

(86) PCT No.: PCT/JP2005/007086

§ 371 (c)(1),
(2), (4) Date: Oct. 4, 2006

(87) PCT Pub. No.: WO2005/101162

PCT Pub. Date: Oct. 27, 2005

(65) Prior Publication Data

US 2007/0209063 A1    Sep. 6, 2007

(30) Foreign Application Priority Data

Apr. 15, 2004    (JP) .............................. 2004-120135

(51) Int. Cl.
*G06F 7/04*     (2006.01)
*G11C 7/00*     (2006.01)
*G06F 21/00*    (2006.01)
*G06F 1/00*     (2006.01)
*G06F 12/14*    (2006.01)
*G06F 15/00*    (2006.01)
*G06F 21/24*    (2006.01)

(52) U.S. Cl. .................. 726/4; 726/2; 726/21; 705/51; 710/241

(58) Field of Classification Search ..................... 726/4, 726/1; 710/241

See application file for complete search history.

(56) References Cited

U.S. PATENT DOCUMENTS

2002/0162005 A1    10/2002    Ueda et al.
2007/0162674 A1*   7/2007    Leichsenring et al. ....... 710/241

FOREIGN PATENT DOCUMENTS

| EP | 1089156 A2 * | 4/2001 |
| JP | 10-320287 | 12/1998 |
| JP | 2002-271309 | 9/2002 |
| WO | 01/82086 | 11/2001 |

OTHER PUBLICATIONS

Stephen Smaldone, Vinod Ganapathy, Liviu Iftode, "Working set-based access control for network file systems", Jun. 2009 SACMAT '09: Proceedings of the 14th ACM symposium on Access control models and technologies, Publisher: ACM, pp. 207-216.*

* cited by examiner

*Primary Examiner*—Matthew B Smithers
*Assistant Examiner*—Courtney D Fields
(74) *Attorney, Agent, or Firm*—Wenderoth, Lind & Ponack L.L.P.

(57) ABSTRACT

An access control device controls an access right with respect to a plurality of electronic devices in a network for each combination of electronic devices. An authority information generating section generates authority information which is used when an electronic device accesses an application on an electronic device. A permission information generating section generates permission information which is information about whether or not the electronic device permits an access request from the electronic device, in relation with the authority information. An access information storing section stores the authority information and the permission information. A transmission control section transmits via the communication section the authority information to the electronic device and the permission information to the electronic device.

10 Claims, 16 Drawing Sheets

F I G. 1
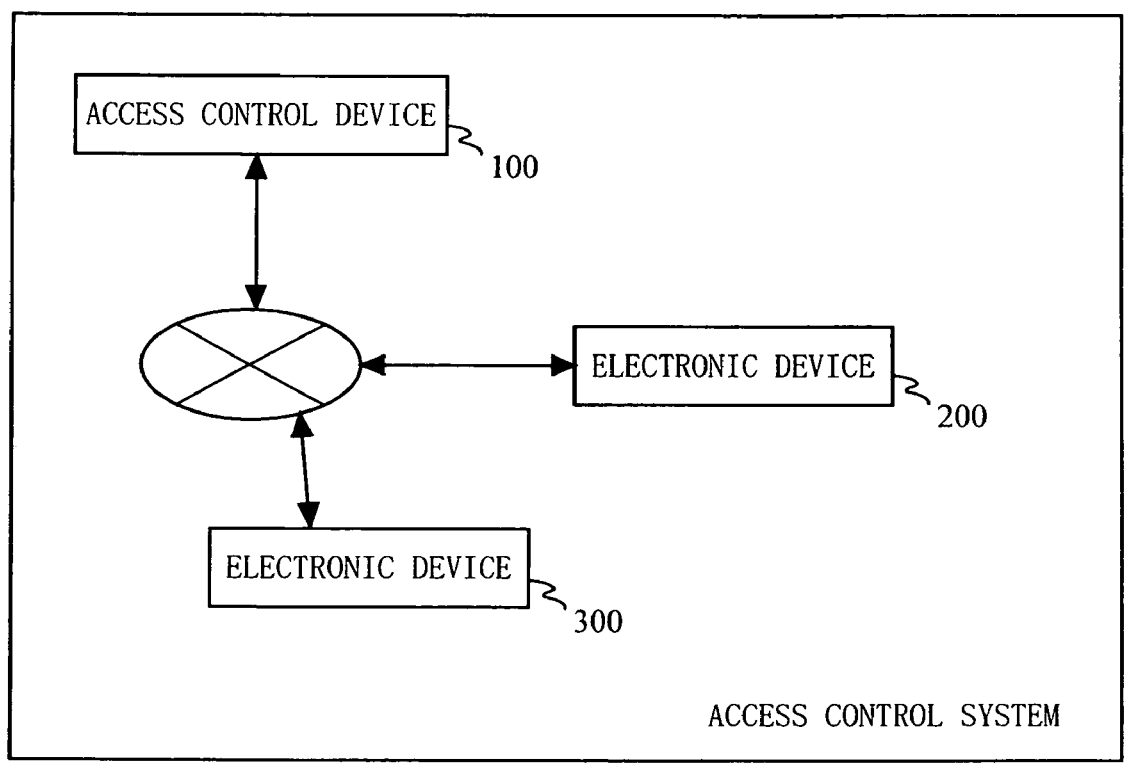

| POLICY INFORMATION | | |
|---|---|---|
| OWNER IDENTIFICATION INFORMATION | DEVICE TYPE INFORMATION | DETERMINATION INFORMATION |
| Joe | P900i | Yes |
| Richard | P505i | No |

ACCESS CONTROL DEVICE AND ELECTRONIC DEVICE

BACKGROUND OF THE INVENTION

1. Technical Field

The present invention relates to an access control device and an electronic device, and more particularly, to an access control device which controls an access right with respect to a plurality of electronic devices present in a network for each combination of electronic devices, and an electronic device which achieves a desired service in association with an application stored in another electronic device via a network, in accordance with a control of the access right by the access control device.

2. Background Art

Conventional electronic devices, such as a digital TV, a mobile telephone, and the like, are increasingly having a function of downloading a program described in Java® language or the like and executing the downloaded program. For example, in the field of mobile telephones, NTT DoCoMo provides a service called "i-appli". In the service, a mobile telephone terminal downloads a Java® program from an application distribution server on the Internet, and executes the program on the terminal. In Europe, a specification called "DVB-MHP (Digital Video Broadcasting-Multimedia Home Platform)" has been established, and a service was already started in conformity with the specification. In digital broadcasting based on the DVB-MHP standards, a digital TV receives and executes a Java® program multiplexed with a broadcast wave.

In such a program distribution service, a number of security functions are incorporated so as to prevent unauthorized access of an application to an electronic device. By using the security functions, conventional electronic devices prevent unauthorized access from an application created by, for example, a malicious creator. Specifically, conventional electronic devices are provided with, for example, a function of confirming authentication information given to an application to confirm the identity of a creator of the application, a function of controlling API (Application Programming Interface) for accessing a computer resource available on an electronic device, depending on the presence or absence of authentication information, or the like.

Patent Document 1 discloses a conventional electronic device having a function of preventing unauthorized access. FIG. 19 is a block diagram illustrating an exemplary configuration of the conventional electronic device. In FIG. 19, the conventional electronic device 900 comprises computer resources 901a to 901c, an application executing section 902, and an access permission control section 903. The computer resources 901a to 901c are resources which are used by the electronic device 900 so as to achieve a predetermined function. Specifically, the computer resources 901a to 901c are a memory resource, a resource for achieving connection with respect to an external device, and the like. The application executing section 902 downloads an application program 902a via a network from an application server 910. When the application program 902a is proved not to be an unauthorized program by a third party or the like, authentication information 902b is attached to the application program 902a.

When the authentication information 902b is attached to the application program 902a, the access permission control section 903 permits access of the application program 902a to all the computer resources 901a to 901c. On the other hand, when the authentication information 902b is not attached to the application program 902a, the access permission control section 903 prohibits access of the application program 902a to all the computer resources 901a to 901c. Thus, the conventional electronic device 900 prevents access of unauthorized programs to the computer resources 901a to 901b.

In recent applications, there are not only an application which achieves a predetermined service using a single electronic device, but also an application which achieves a predetermined service in association with a plurality of electronic devices via a network. Examples of an electronic device which executes such an application include a mobile telephone which performs timer recording with respect to a video recorder device, a personal computer which shares image data, and the like. When executing such an application, the conventional electronic device 900 controls access of unauthorized applications to a computer resource for network connection, thereby controlling connection to all networks (i.e., all devices).

Patent Document 1: Japanese Patent Laid-Open Publication No. 10-320287

SUMMARY OF THE INVENTION

When executing an application which provides a predetermined service in association with another device, the conventional electronic device 900 can control access to all networks (i.e., all devices), however, cannot control an access right corresponding to a combination of electronic devices. For example, the conventional electronic device 900 cannot perform a control such that a video recorder device A is permitted to perform timer recording, while a video recorder device B is not permitted to perform timer recording. In other words, when a plurality of devices achieve a predetermined service in association with each other, the conventional electronic device 900 cannot control an access right of a combination of devices in accordance with the user's intention.

Therefore, an object of the present invention is to provide an access control device which controls an access right with respect to a plurality of electronic devices in a network for each combination of electronic devices, and an electronic device which achieves a predetermined service in association with an application stored in another electronic device via a network, in accordance with a control of the access control device.

The present invention is directed to an access control device connected via a network to a plurality of electronic devices including a first electronic device and a second electronic device which execute a predetermined application in association with each other. To achieve the above-described object, the access control device of the present invention comprises an authority information generating section, a permission information generating section, a communication section, a reception control section, an access information storing section, and a transmission control section.

The authority information generating section generates authority information which is information which defines authority with which the first electronic device requests access to the second electronic device. The permission information generating section generates permission information which is information for determining whether or not the second electronic device gives access permission to the access request based on the authority information from the first electronic device, in relation with the authority information. The communication section communicates with the plurality of electronic devices via the network. The reception control section receives a request for generation of the authority information via the communication section from the first electronic device, and instructs the authority information generating section to generate the authority information. The access information storing section stores the authority information and the permission information. The transmission control section transmits, via the communication section, the authority information to the first electronic device and the permission information to the second electronic device.

Preferably, the access control device further comprises a policy information storing section and a policy determining section. The policy information storing section stores a policy for determining whether or not generation of the authority information is permitted with respect to the request for generation of the authority information from the first electronic device. The reception control section, when receiving the request for generation of the authority information, inquires the policy determining section whether or not generation of the authority information is permitted. Only when the policy determining section determines that generation of the authority information is permitted, the reception control section instructs the authority information generating section to generate the authority information.

The authority information includes an application secret key generated corresponding to an application executed by the first electronic device, and an access list which lists a function of the application given authority for accessing the second electronic device. The permission information includes an application public key generated in a pair with the application secret key, and the access list.

Preferably, the authority information generating section generates authority information which is signed using a secret key possessed by the authority information generation itself. Also, the permission information generating section generates permission information which is signed using a secret key possessed by the permission information generating section itself.

Also, the present invention is directed to, in a network composed of a plurality of electronic devices and an access control device, an electronic device for executing a predetermined application in association with another electronic device. To achieve the above-described object, the electronic device of the present invention comprises a communication section, an authority information receiving section, an authority information storing section, an application executing section, and a control section.

The communication section communicates with the plurality of electronic devices and the access control device via the network. The authority information receiving section receives authority information which is information which defines authority for requesting access to the other electronic device. The authority information storing section stores the authority information received by the authority information receiving section. The application executing section executes the predetermined application to generate a request for access to the other electronic device. The control section controls the request for access to the other electronic device. Preferably, the control section requests access to the other electronic device only when it is determined based on the authority information that the access request is given authority.

Preferably, the electronic device further comprises an authority information requesting section for requesting the access control device to generate the authority information, in accordance with an instruction of the control section. In this case, when the authority information corresponding to the other electronic device is not stored in the authority information storing section, the control section instructs the authority information requesting section to request generation of the authority information.

The authority information includes an application secret key generated corresponding to the predetermined application, and an access list which lists a function of the application given authority for access to the other electronic device. Preferably, the control section requests access to the other electronic device only when a function corresponding to the access request generated by the application executing section is included in the access list.

Also, the present invention is directed to, in a network composed of a plurality of electronic devices and an access control device, an electronic device for executing a predetermined application in association with another electronic device. To achieve the above-described object, the electronic device of the present invention comprises a communication section, a permission information receiving section, a permission information storing section, an application executing section, and a control section.

The communication section communicates with the plurality of electronic devices and the access control device via the network. The permission information receiving section receives permission information which is information for determining whether or not access permission is given to an access request from the other electronic device, via the communication section, from the access control device. The permission information storing section stores the permission information received by the permission information receiving section. The application executing section executes the predetermined application. The control section controls the access request to the application executing section from the other electronic device. The control section determines whether or not the access request from the other electronic device is permitted, based on the permission information stored in the permission information.

The permission information includes an application secret key generated corresponding to an application executed by the other electronic device, and an access list which lists a function of the application which permits the access request from the other electronic device. Preferably, the control section permits the access request from the other electronic device only when a function corresponding to the access request from the other electronic device is included in the access list.

Processes performed by the authority information generating section, the permission information generating section, the communication section, the reception control section, the access information storing section, and the transmission control section of the access control device can be implemented as an access control method which provides a series of procedures. The access control method of the present invention comprises an authority information generating step, a permission information generating step, a communicating step, a receiving step, an instructing step, and a transmitting step.

The authority information generating step generates authority information which is information which defines authority with which the first electronic device requests access to the second electronic device. The permission information generating step generates permission information which is information for determining whether or not the second electronic device gives access permission to the access request based on the authority information from the first electronic device, in relation with the authority information. The communicating step communicates with the plurality of electronic devices via the network. The receiving step receives a request for generation of the authority information via the communicating step from the first electronic device. The instructing step instructs the authority information generating step to generate the received authority information.

The transmitting step transmits the authority information to the first electronic device and the permission information to the second electronic device.

Preferably, the access control method is provided in the form of a program for causing an access control device to execute the series of procedures. The program may be stored in a computer readable storage medium.

Processes performed by the communication section, the authority information receiving section, the authority information storing section, the application executing section, and the control section can be implemented as, in a network composed of a plurality of electronic devices and an access control device, a method with which an electronic device for executing a predetermined application in association with another electronic device, requests access to the other electronic device.

The access request method of the present invention comprises a communicating step, a receiving step, an executing step, and a requesting step. The communicating step communicates with the plurality of electronic devices and the access control device via the network. The receiving step receives, via the communicating step, authority information which is information which defines authority for requesting access to the other electronic device. The executing step executes the predetermined application to generate a request for access to the other electronic device. The requesting step requests access to the other electronic device via the communicating step only when it is determined based on the authority information that the access request is given authority.

Preferably, the access request method is provided in the form of a program for causing an access control device to execute the series of procedures. The program may be stored in a computer readable storage medium.

Processes performed by the communication section, the permission information receiving section, the permission information storing section, the application executing section, and the control section of the electronic device can be implemented as, in a network composed of a plurality of electronic devices and an access control device, a method with which an electronic device for executing a predetermined application in association with another electronic device, determines whether or not to permit an access request from the other electronic device.

The method for determining whether or not to permit an access request comprises a communicating step, a receiving step, an executing step, and a determining step. The communicating step communicates with the plurality of electronic devices and the access control device via the network. The receiving step receives, via the communicating step, permission information which is information for determining whether or not access permission is given to the access request from the other electronic device. The executing step executes the predetermined application. The determining step determines whether or not the access request from the other electronic device is permitted, based on the permission information.

Preferably, the method for determining whether or not to permit an access request is provided in the form of a program for causing an access control device to execute the series of procedures. The program may be stored in a computer readable storage medium.

According to the present invention, an access control device generates authority information and permission information in relation with each other, and transmits the generated authority information to an electronic device which is to do access, and the permission information to an electronic device which is to be accessed. Thereby, the access control device can control an access right to a plurality of electronic devices present in a network for each combination of electronic devices.

Since an electronic device of the present invention requests access to another electronic device only when given authority according to authority information, it is possible to prevent request for access to an electronic device which is not given authority. Also, since an electronic device permits access from another electronic device only when permitted according to permission information, it is possible to prevent access from an electronic device which is not given permission. Thereby, the electronic devices which are given the authority information and the permission information by the access control device, can provide a predetermined service in association with each other via a network while preventing unauthorized access.

BRIEF DESCRIPTION OF THE DRAWINGS

FIG. 1 is a diagram illustrating an exemplary network configuration of an access control system according to an embodiment of the present invention.

Figure 2:
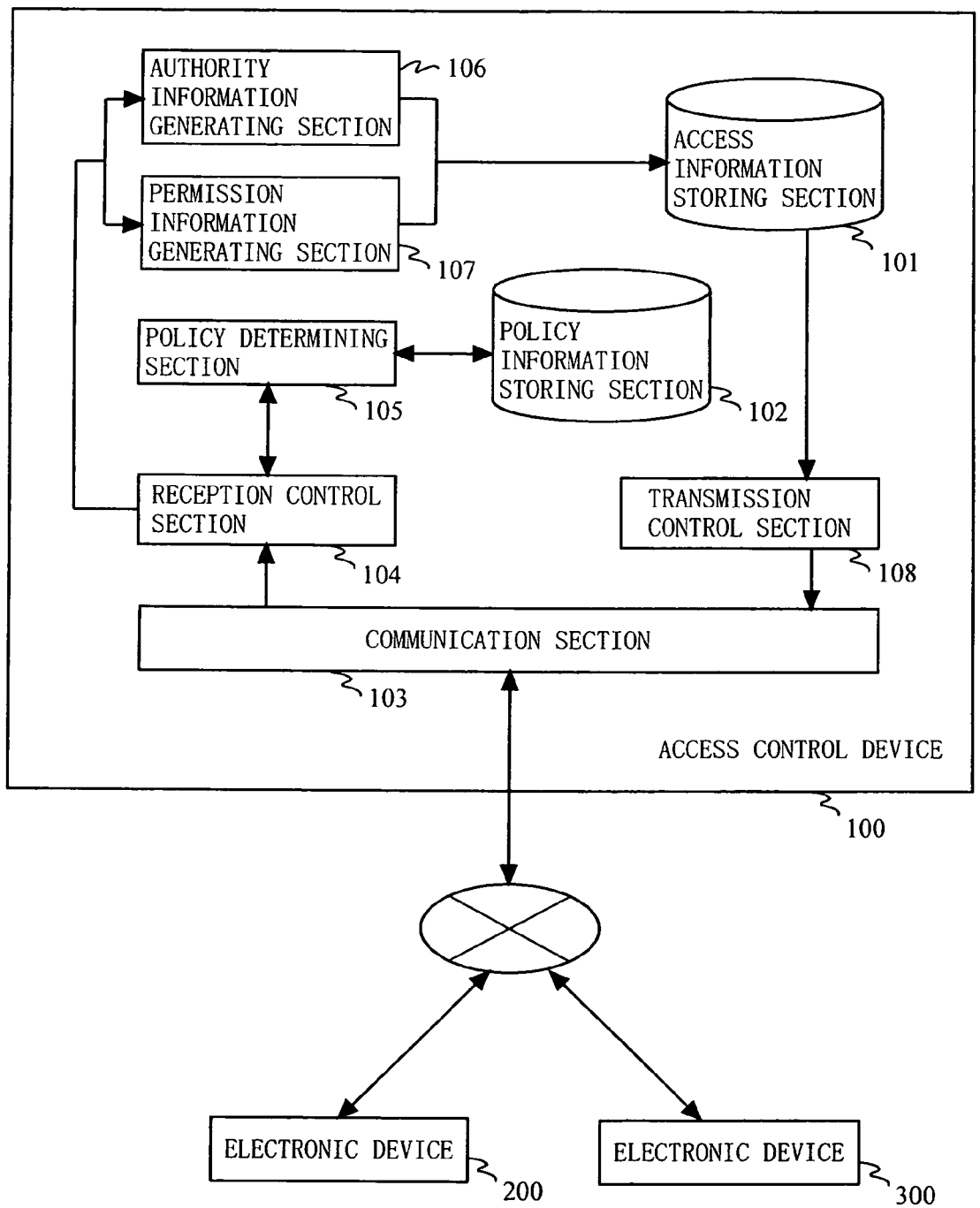
FIG. 2 is a block diagram illustrating an exemplary configuration of an access control device 100 according to an embodiment of the present invention.

DESCRIPTION OF THE REFERENCE CHARACTERS 100 access control device
101 access information storing section
102 policy information storing section
103, 206, 306 communication section
104 reception control section
105 policy determining section
106 authority information generating section
107 permission information generating section
108 transmission control section
200, 300 electronic device
201 authority information storing section
202, 302 application executing section
203, 303 control section
204 authority information requesting section
205 authority information receiving section
301 permission information storing section
305 permission information receiving section

DETAILED DESCRIPTION OF THE INVENTION

Hereinafter, embodiments of the present invention will be described with reference to the accompanying drawings.

FIG. 1 is a diagram illustrating an exemplary network configuration of an access control system according to an embodiment of the present invention. In FIG. 1, in the access control system of the present invention, an access control device 100, an electronic device 200, and an electronic device 300 are connected to each other via a network.

The access control device 100 is a device which controls an access right with respect to the electronic device 200 and the electronic device 300. Specifically, the access control device 100 gives authority information or permission information to the electronic device 200 and the electronic device 300 so as to control the access right with respect to the electronic device 200 and the electronic device 300. The authority information refers to information which defines an authority for requesting access from an application in which one electronic device is present to the other electronic device. The permission information refers to information for determining whether or not access permission is given to an access request based on authority information from one electronic device, by the other electronic device. Hereinafter, authority information and permission information are collectively referred to as access information.

The electronic device 200 and the electronic device 300 are electronic devices which achieve a desired service in association with each other. Specifically, the electronic device 200 and the electronic device 300 correspond to general electronic devices including a personal computer, a digital television, a set-top box, a DVD recorder, a BlueRay Disc (BD) recorder, a car navigation terminal, a mobile telephone, a PDA, and the like. It is here assumed that the electronic device 200 is a device which requests access to the electronic device 300, and the electronic device 300 is a device which permits access from the electronic device 200. For example, in order to reference data stored in the electronic device 300, the electronic device 200 requests access to the electronic device 300 using authority information. The electronic device 300 uses permission information corresponding to the authority information to determine whether or not access required by the electronic device 200 is permitted.

Note that the access control device 100 may be implemented as software incorporated in the electronic device 200 or the electronic device 300. Although the access control device 100 is connected to two electronic devices, i.e., the electronic device 200 and the electronic device 300, the access control device 100 may be connected to more than two electronic devices.

[Access Control Device 100]

FIG. 2 is a block diagram illustrating an exemplary configuration of the access control device 100 of the embodiment of the present invention. In FIG. 2, the access control device 100 of the present invention comprises an access information storing section 101, a policy information storing section 102, a communication section 103, a policy determining section 105, an authority information generating section 106, a permission information generating section 107, and a transmission control section 108.

The access information storing section 101 stores the above-described authority information and permission information. Note that the authority information and the permission information will be described in detail below. The policy information storing section 102 stores policy information for determining whether or not issuance of authority information is permitted with respect to a request for authority information from an electronic device. It is assumed that registration of information into the policy information storing section 102 is performed by an owner of the access control device 100. Note that the registration may be performed via a network from the electronic device 200 or the electronic device 300. Note that, in such a case, the access control device 100 and an electronic device which performs policy registration need to be additionally authenticated using a password, a certificate, or the like.

Figures 3, 4:
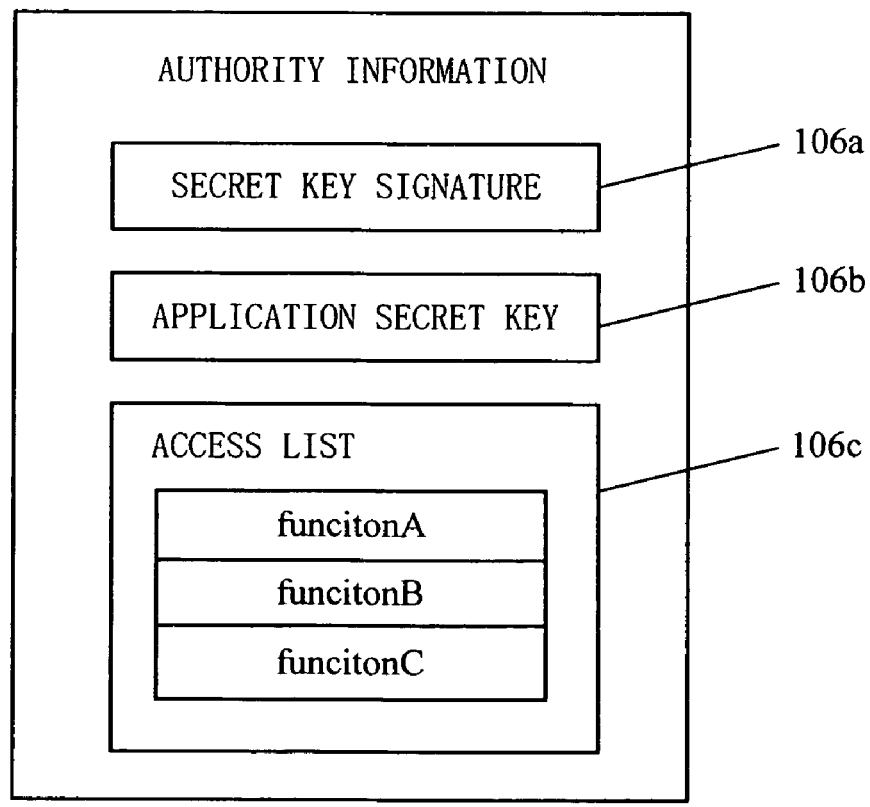
FIG. 3 is a diagram illustrating exemplary policy information stored in a policy information storing section 102.
FIG. 4 is a diagram illustrating exemplary policy information stored in the policy information storing section 102.

FIG. 3 is a diagram illustrating an example of the policy information stored in the policy information storing section 102. Referring to FIG. 3, the policy information includes owner identification information, device type information, and determination information. The owner identification information refers to information for identifying an owner of an electronic device which requests authority information. The device type information refers to information for specifying a type of an electronic device which requests authority information. The determination information refers to information for determining whether or not issuance of authority information is permitted.

The communication section 103 communicates with devices, such as the electronic device 200, the electronic device 300, and the like via a network. The communication section 103 performs communication in accordance with a protocol, such as TLS (Transport Layer Security), HTTP (Hypertext Transfer Protocol), or the like.

A reception control section 104 receives a request for issuance of authority information via the communication section 103 from the electronic device 200 or the electronic device 300. The policy determining section 105 determines whether or not the request for issuance of authority information received by the reception control section 104 is permitted, based on the policy information stored in the policy information storing section 102.

The authority information generating section 106 generates authority information based on the determination by the policy determining section 105. FIG. 4 is a diagram illustrating an example of the authority information generated by the authority information generating section 106. In FIG. 4, the authority information includes a secret key signature 106a, an application secret key 106b, and an access list 106c.

The secret key signature 106a refers to the result of signing the application secret key 106b and the access list 106c using a secret key held by the access control device 100. The application secret key 106b refers to a secret key which is generated, corresponding to an application executed by the electronic device 200. The application secret key 106b is generated in a pair with an application public key 107b (described below) included in permission information. The access list 106c refers to a list which lists a function to which an access right is given by the authority information.

The access list 106c lists three functions, i.e., a function A, a function B, and a function C. Here, the function A, the function B, and the function C define remote procedure call functions which are used to access the other electronic device. Specifically, the function A is a remote procedure call function which is used, for example, when a mobile telephone requests obtaining of video data from a video server which stores the video data.

Note that the access list 106c may be a list other than remote procedure call functions. For example, the access list 106c may be a list of access protocols, such as FTP (File Transfer Protocol), HTTP (Hyper Text Transfer Protocol), TELNET, and the like.

Figure 5:
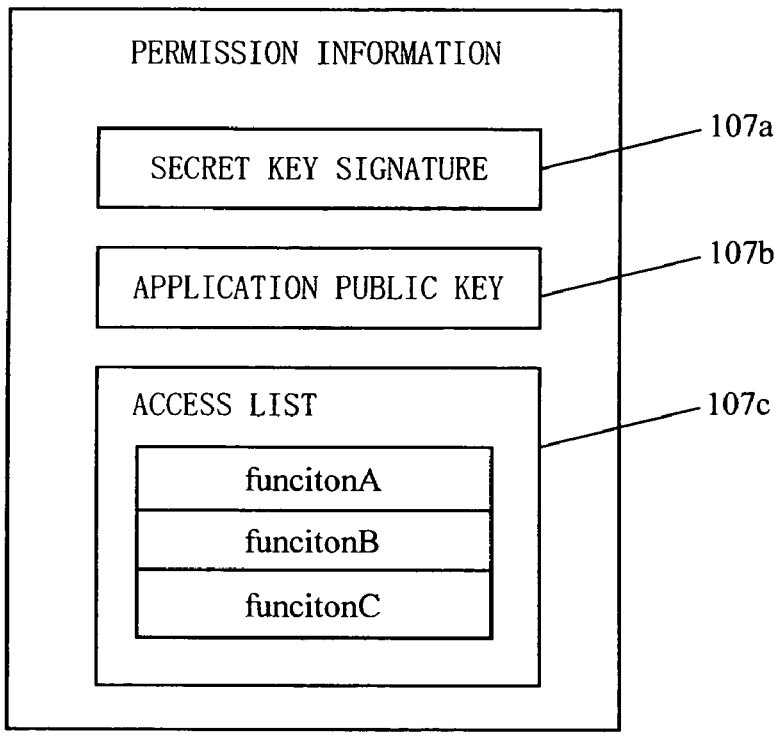
FIG. 5 is a diagram illustrating exemplary permission information generated by a permission information generating section 107.

The permission information generating section 107 generates permission information based on the determination of the policy determining section 105. FIG. 5 is a diagram illustrating an example of the permission information generated by the permission information generating section 107. Referring to FIG. 5, the permission information includes a secret key signature 107a, an application public key 107b, and an access list 107c.

The secret key signature 107a refers to the result of signing the application public key 107b and the access list 107c using the secret key possessed by the access control device 100. The application public key 107b refers to a public key generated corresponding to an application. The application public key 107b is generated in a pair with the application secret key 106b included in the above-described authority information.

The access list 107c refers to a list which lists functions to which access is permitted in accordance with the permission information. The access list 107c lists three functions, i.e., the function A, the function B, and the function C, as in the access list 106c (see FIG. 4) included in the authority information.

The transmission control section 108 reads out the authority information and the permission information from the access information storing section 101, and transmits the authority information and the permission information via the communication section 103 to the electronic device 200 and the electronic device 300. In this case, the transmission control section 108 may encrypt the authority information and the permission information before transmission.

Figure 6:
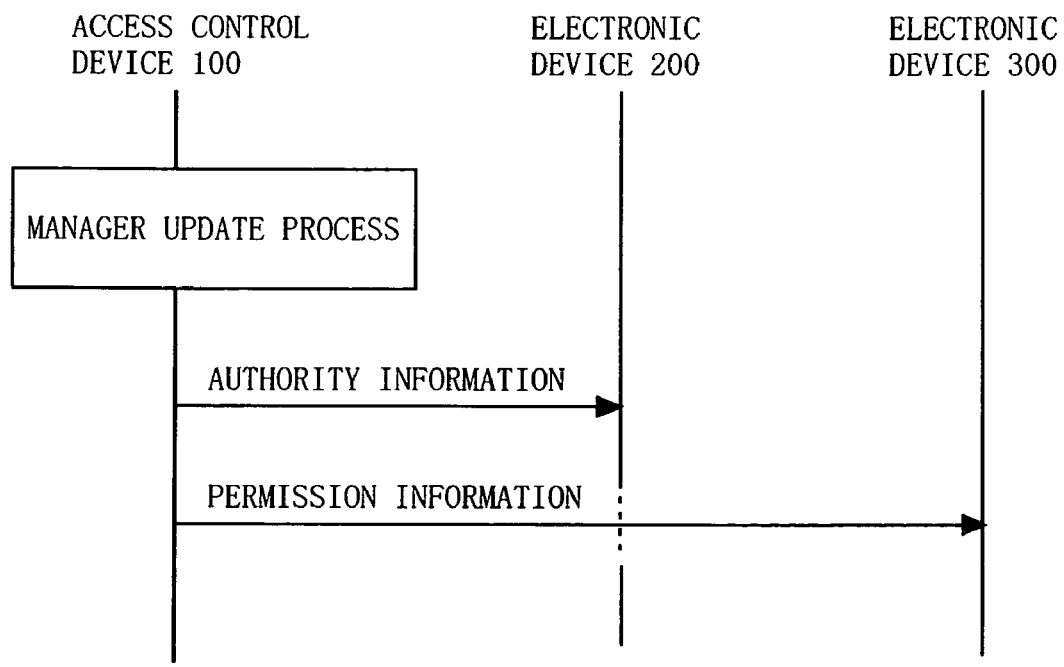
FIG. 6 is a sequence diagram illustrating an exemplary operation of the access control device 100 when authority information and permission information are updated by a manager.

Next, an operation of the access control device 100 of this embodiment will be described with reference to FIGS. 6 to 12. FIG. 6 is a sequence diagram illustrating an exemplary operation of the access control device 100 when the authority information and the permission information are updated by a manager. Referring to FIG. 6, when the manager updates the authority information and the permission information, the access control device 100 performs a predetermined process and transmits the updated authority information and permission information to the electronic device 200 and the electronic device 300. Hereinafter, the predetermined process which is performed by the access control device 100 in this case is referred to as a manager update process.

Figure 7:
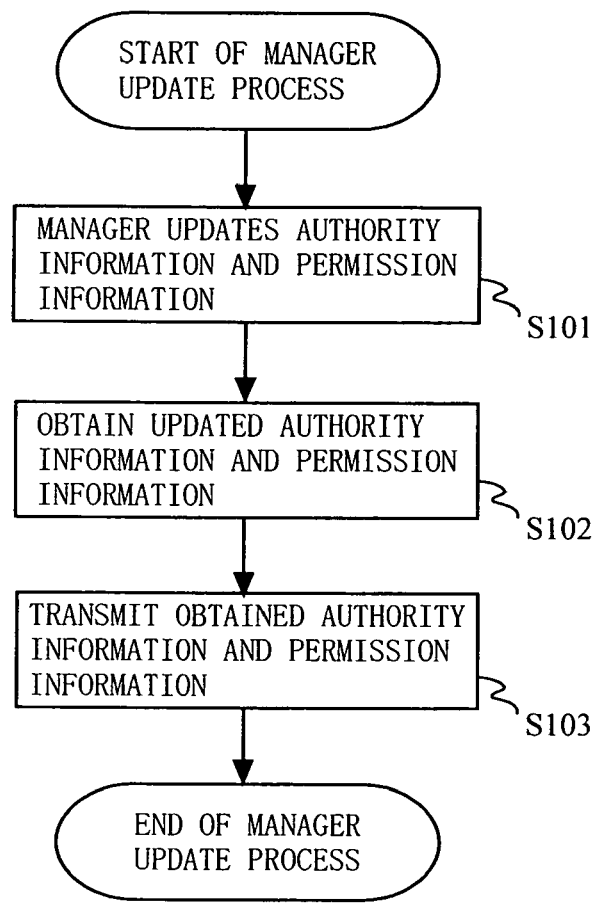
FIG. 7 is a flowchart illustrating an exemplary operation of a manager update process performed by the access control device 100.

FIG. 7 is a flowchart illustrating an exemplary operation of the manager update process performed by the access control device 100. Referring to FIG. 7, the manager of the access control device 100 uses some means (e.g., a keyboard connected to the access control device 100, etc.) to update the authority information and the permission information which are stored in the access information storing section 101 (step S101). When the access information storing section 101 is updated, the transmission control section 108 obtains the updated authority information and permission information from the access information storing section 101 (step S102). Next, the transmission control section 108 transmits the obtained authority information and permission information via the communication section 103 to the electronic device 200 and the electronic device 300 (step S103). In this case, the transmission control section 108 may encrypt the authority information and the permission information before transmission.

Figure 8:
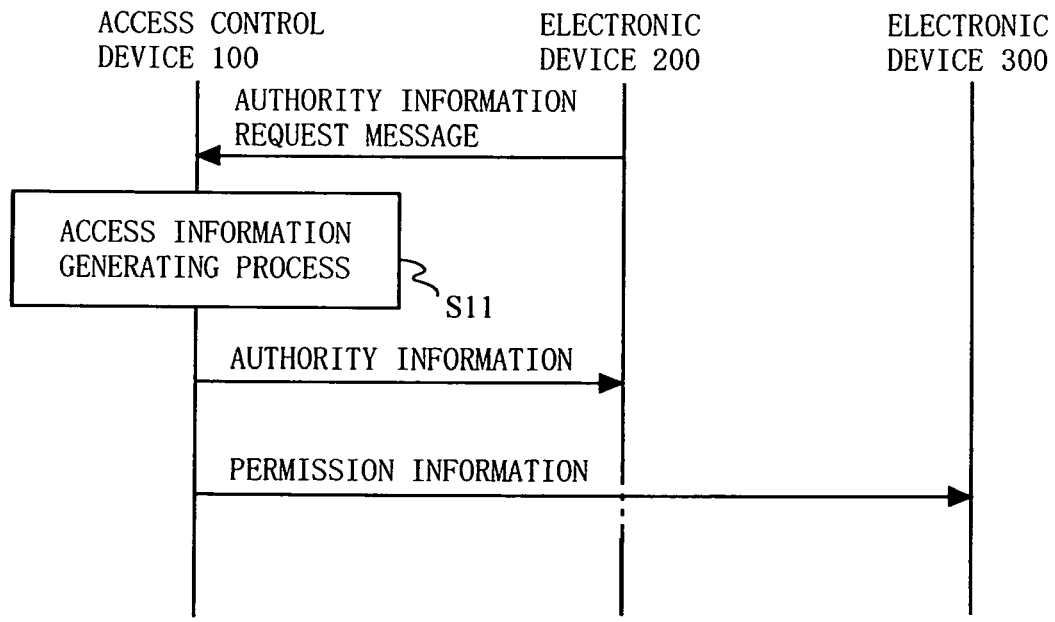
FIG. 8 is a diagram illustrating an operation sequence of the access control device 100 when an authority information request message is received from an electronic device 200.

FIG. 8 is a diagram illustrating an operation sequence of the access control device 100 when an authority information request message is received from the electronic device 200. Referring to FIG. 8, when receiving the authority information request message from the electronic device 200, the access control device 100 performs an access information generating process to generate authority information and permission information. Thereafter, the access control device 100 transmits the authority information generated by the access information generating process to the electronic device 200, and the permission information to the electronic device 300. Note that the authority information request message refers to a message which is transmitted by the electronic device 200 (or the electronic device 300) when requesting authority information from the access control device 100.

Figure 9:
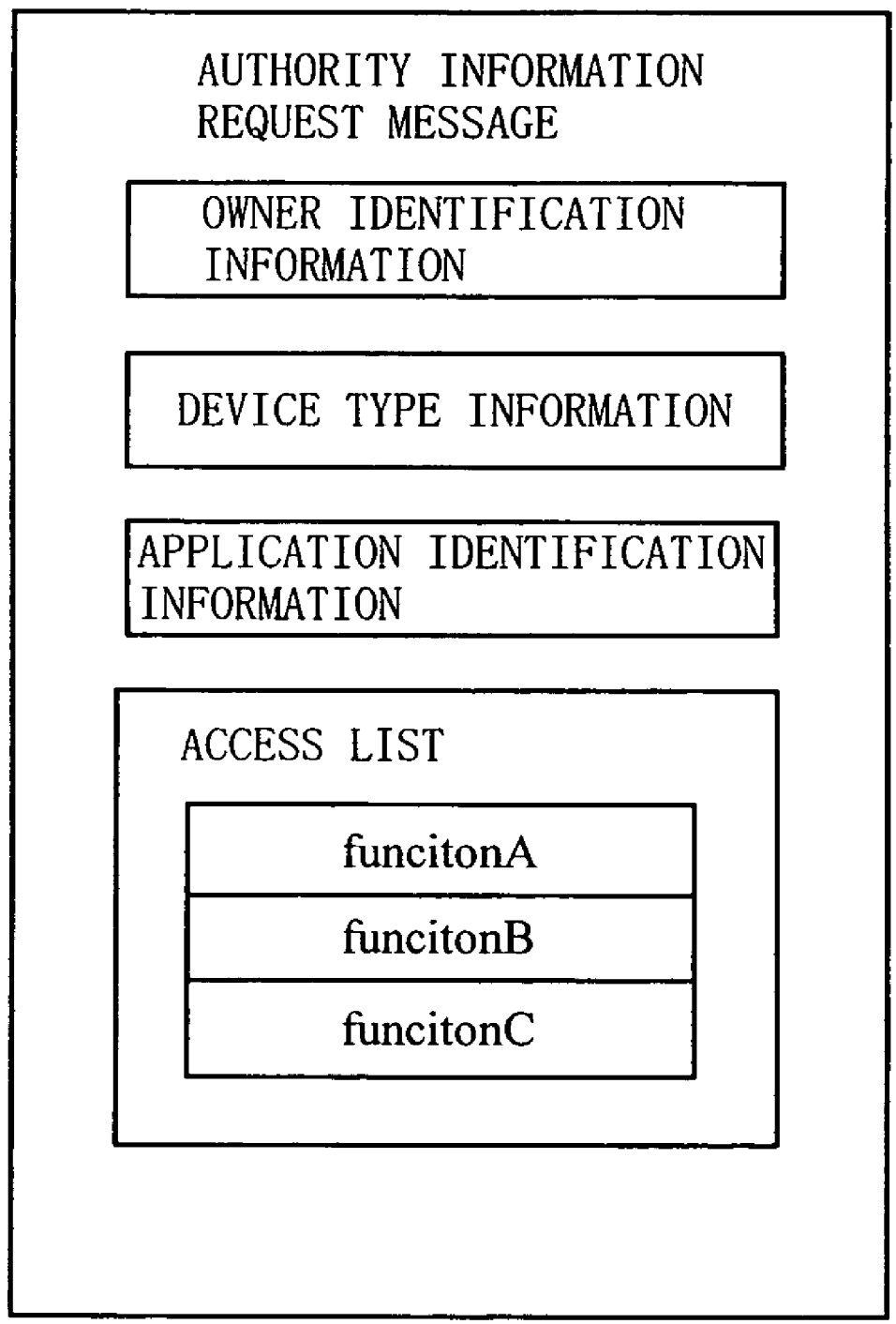
FIG. 9 is a diagram illustrating an exemplary configuration of the authority information request message.

FIG. 9 is a diagram illustrating an exemplary configuration of the authority information request message. Referring to FIG. 9, the authority information request message is composed of owner identification information, device type information, application identification information, an access list, and the like. The owner identification information refers to information for identifying an owner of an electronic device. The device type information refers to information for identifying a device type of an electronic device. The application identification information refers to information for identifying an application which requests issuance of authority information. The access list refers to a list which lists entry points which allow access from an application present on an electronic device to other electronic devices.

Figure 10:
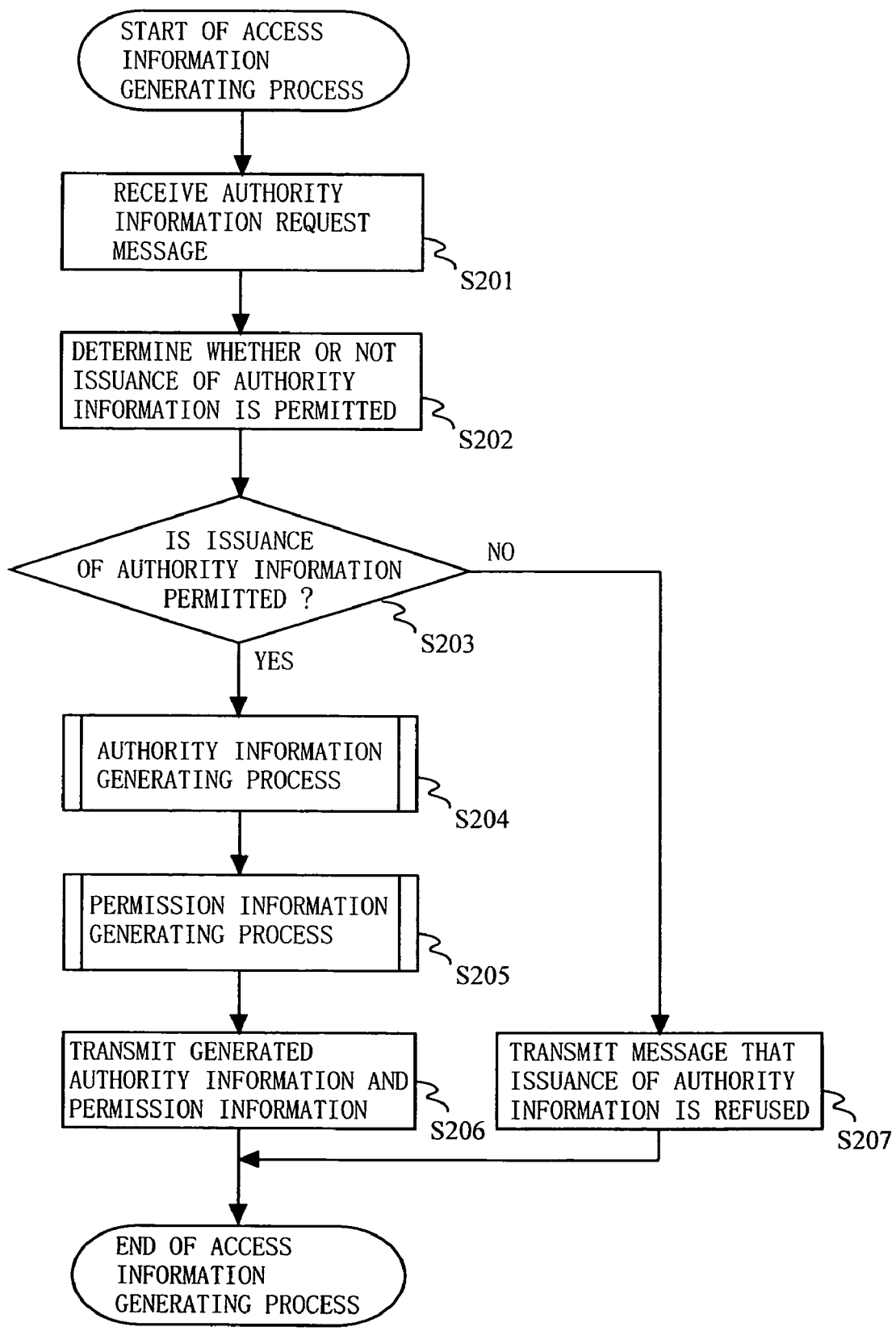
FIG. 10 is a flowchart illustrating an exemplary operation of an access information generating process performed by the access control device 100.

FIG. 10 is a flowchart illustrating an exemplary operation of the access information generating process performed by the access control device 100. Referring to FIG. 10, the reception control section 104 receives the authority information request message via the communication section 103 from the electronic device 200 (step S201). When receiving the authority information request message via the communication section 103, the reception control section 104 requests the policy determining section 105 to determine whether or not issuance of authority information requested in the authority information request message is permitted. The policy determining section 105 determines whether or not the requested issuance of authority information is permitted, in response to the request from the reception control section 104 (steps S202 and S203). Specifically, the policy determining section 105 searches the policy information storing section 102 for the determination information, using as keys the owner information and the device type information included in the authority information request message, to determine whether or not issuance of authority information is permitted with respect to the electronic device 200.

When the policy determining section 105 determines that issuance of authority information is permitted, the reception control section 104 instructs the authority information generating section 106 and the permission information generating section 107 to generate authority information and permission information. When instructed by the reception control section 104 to generate authority information, the authority information generating section 106 performs an authority information generating process to generate authority information (step S204). When instructed by the reception control section 104 to generate permission information, the permission information generating section 107 performs a permission information generating process to generate permission information (step S205). The authority information generating process and the permission information generating process will be described in detail below. The generated authority information and permission information are stored in the access information storing section 101.

When the information stored in the access information storing section 101 is updated, the transmission control section 108 specifies destinations for the authority information and the permission information, and transmits the authority information and the permission information via the communication section 103 to the respective corresponding electronic devices. Specifically, the transmission control section 108 transmits the authority information to the electronic device 200 which is a sender of the authority information request message. The transmission control section 108 also transmits the permission information to the electronic device 300 which is requested for access by the electronic device 200. In this case, the transmission control section 108 may encrypt the authority information and the permission information using a secret key held by an electronic device which is a destination.

On the other hand, when the policy determining section 105 determines that issuance of authority information is not permitted, the reception control section 104 generates a message that issuance of authority information is refused, and transmits the message to the electronic device 200 which requests issuance of authority information (step S207).

Note that, after the policy determining section 105 determines that issuance of authority information is permitted, the reception control section 104 may perform an application authenticating process which inquires a third party whether the application transmitting the authority information request message is not an unauthorized program. When the authenticity of the application is not confirmed in the application authenticating process, the reception control section 104 transmits to the electronic device 200 a message that issuance of authority information is refused.

Figure 11:
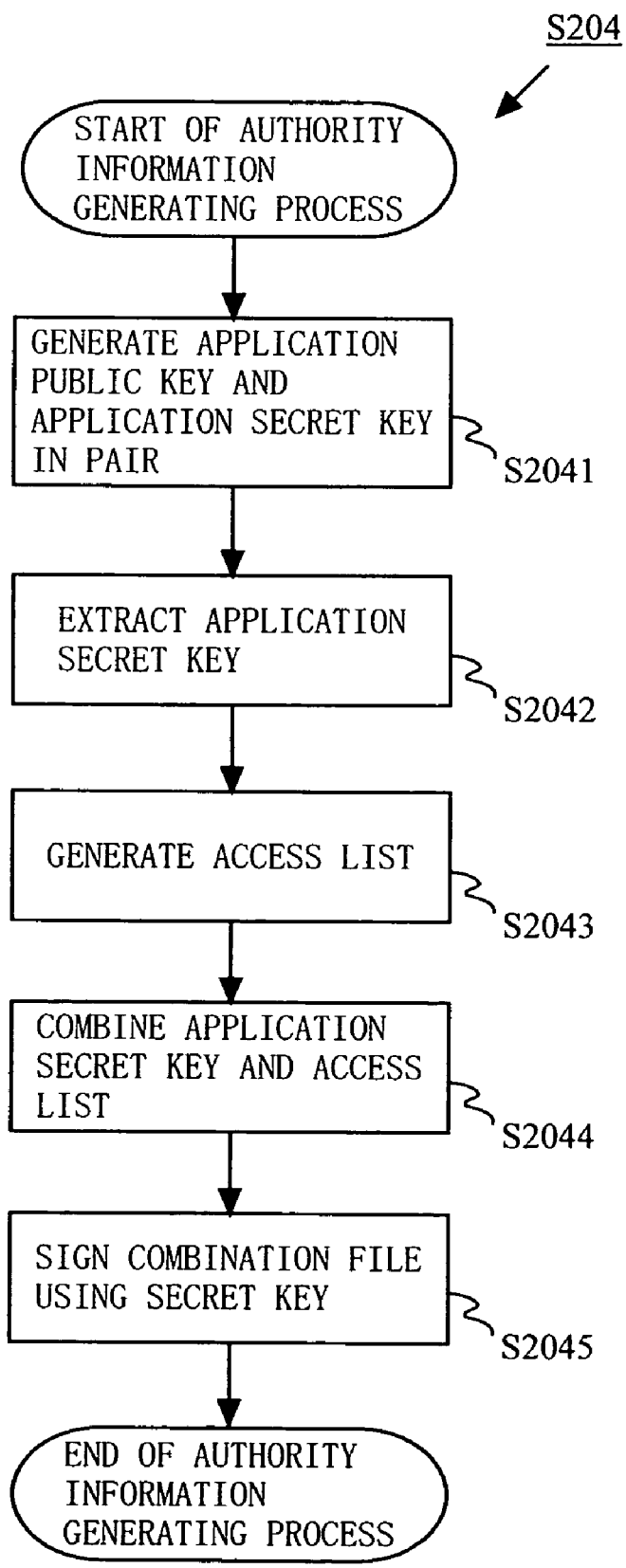
FIG. 11 is a flowchart illustrating an exemplary detailed operation of an authority information generating process.

FIG. 11 is a flowchart illustrating an exemplary detailed operation of the authority information generating process (step S204). Referring to FIG. 11, the authority information generating section 106 generates a pair of an application public key and an application secret key with respect to an application (step S2041).

The authority information generating section 106 extracts the application secret key from the generated pair of the application public key and the application secret key (step S2042). The authority information generating section 106 generates an access list which is a list which lists entry points which allow access from an application present on the electronic device 200 to other electronic devices (step S2043).

The authority information generating section 106 combines the application secret key and the access list (step S2044). Here, the combination indicates that the application secret key and the access list are brought together into the same file. Next, the authority information generating section 106 signs the file obtained by combining the application secret key and the access list using the secret key held by the access control device 100 (step S2045). By the above-described operation, the authority information generating section 106 generates authority information (see FIG. 4).

Figure 12:
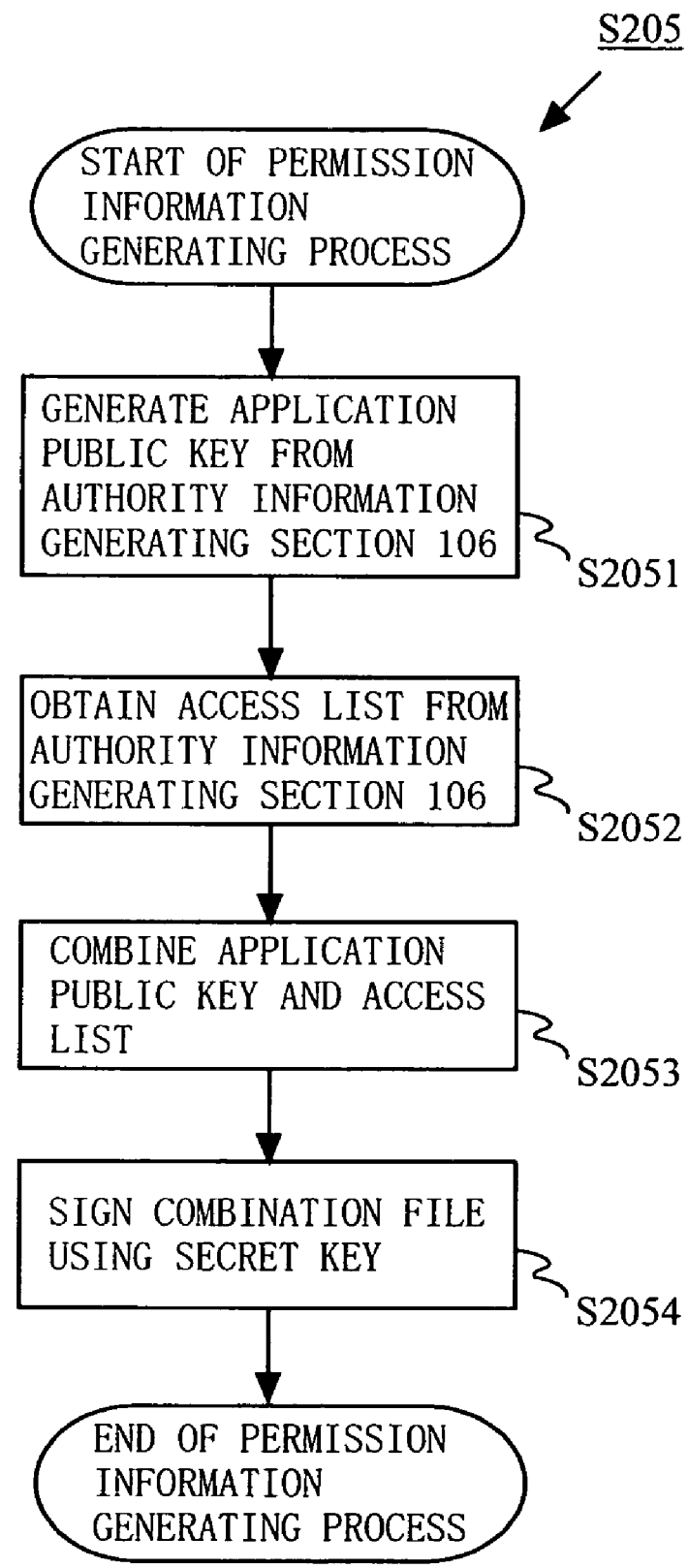
FIG. 12 is a flowchart illustrating an exemplary detailed operation of a permission information generating process (step S205).

FIG. 12 is a flowchart illustrating an exemplary detailed operation of the permission information generating process (step S205). Referring to FIG. 12, the permission information generating section 107 obtains the application public key which is generated in a pair with the application secret key, from the authority information generating section 106 (step S2051). The permission information generating section 107 also obtains the access list generated by the authority information generating section 106 (step S2052).

The permission information generating section 107 combines the application public key and the access list obtained from the authority information generating section 106 (step S2053). Here, the combination indicates that the application public key and the access list are brought together into the same file. Next, the permission information generating section 107 signs the file obtained by combining the application public key and the access list using the secret key held by the access control device 100 (step S2054). By the above-described operation, the permission information generating section 107 generates permission information (see FIG. 5).

Thereby, the access control device 100 can permit access to the electronic device 300 holding the permission information only from an application which is given the authority information and is operated on the electronic device 200, thereby making it possible to flexibly control an access right for each application.

[Electronic Devices]

Figure 13:
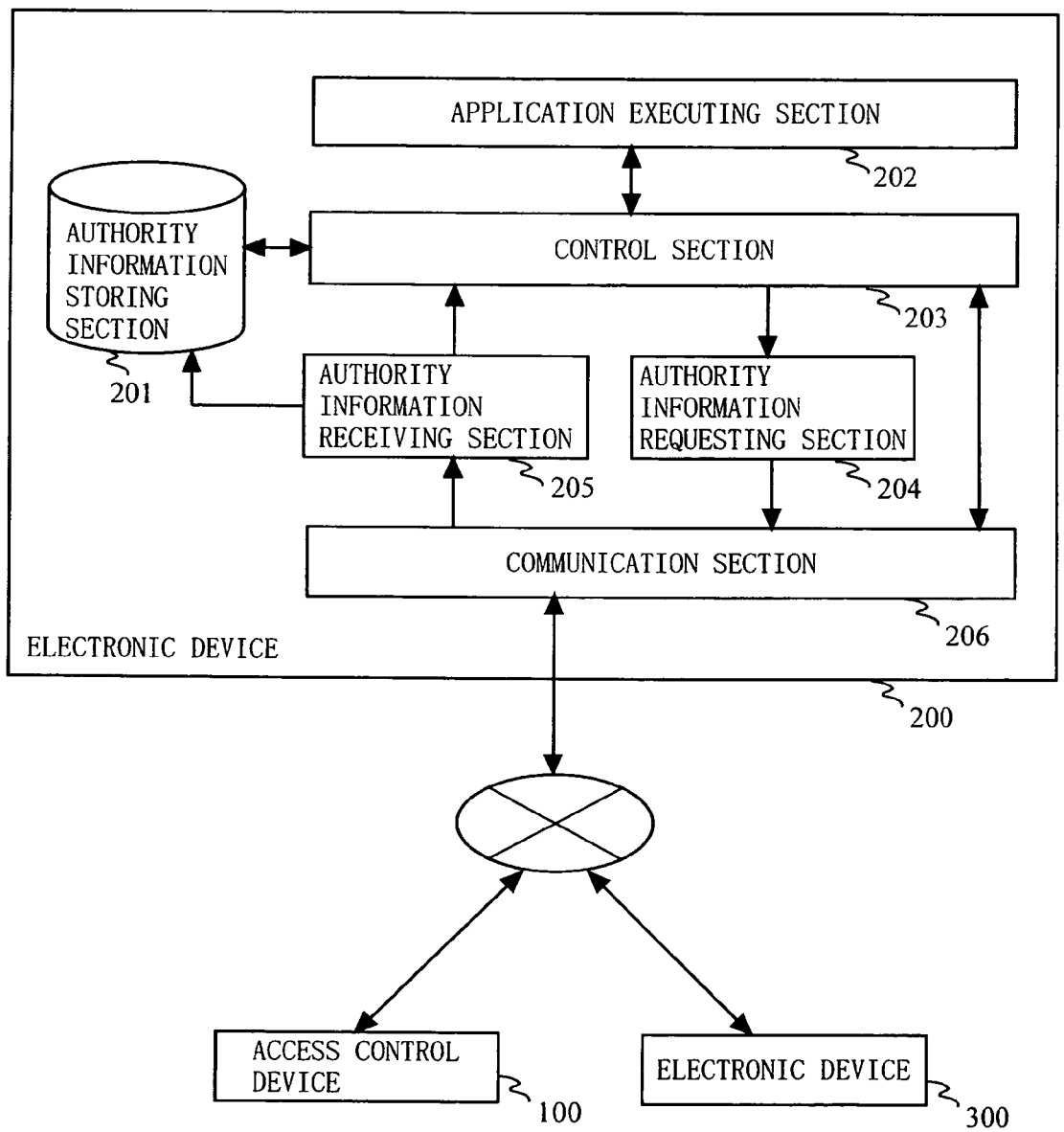
FIG. 13 is a block diagram illustrating an exemplary configuration of an electronic device 200 according to an embodiment of the present invention.

Next, configurations and operations of the electronic device 200 and the electronic device 300 will be described. FIG. 13 is a block diagram illustrating an exemplary configuration of the electronic device 200 according to an embodiment of the present invention. In FIG. 13, the electronic device 200 of the present invention comprises an authority information storing section 201, an application executing section 202, a control section 203, an authority information requesting section 204, an authority information receiving section 205, and a communication section 206.

The authority information storing section 201 stores authority information received from the access control device 100. The application executing section 202 executes a predetermined application which can be performed in association with another electronic device. For example, the application executing section 202 is a virtual Java® machine which executes an application described in Java® programming language. The control section 203 controls access to or from another electronic device. The authority information requesting section 204 requests authority information from the access control device 100. The authority information receiving section 205 receives authority information transmitted from the access control device 100. The communication section 206 communicates with external devices, such as the access control device 100, the electronic device 300, and the like, via a network.

Figure 14:
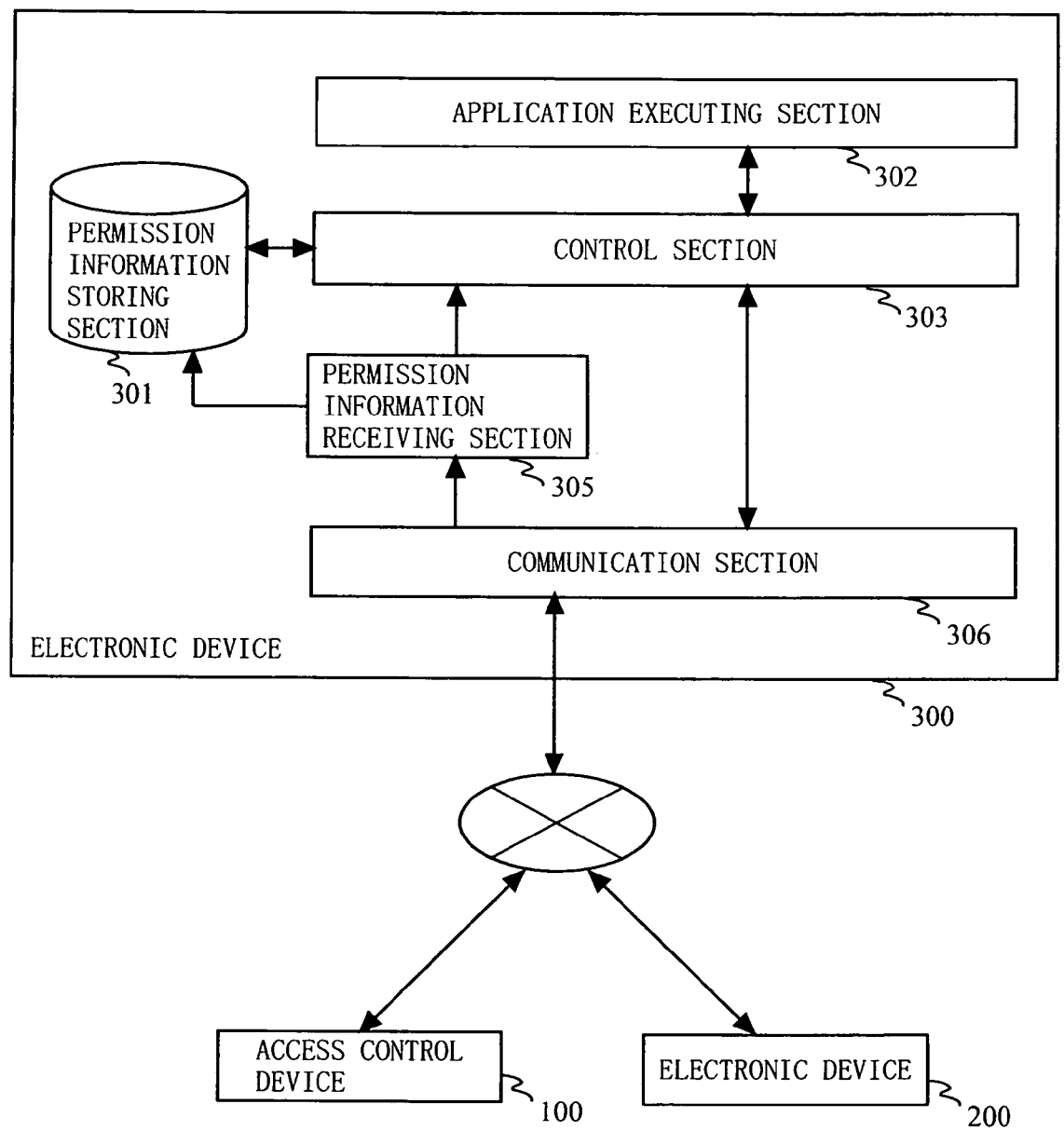
FIG. 14 is a block diagram illustrating an exemplary configuration of an electronic device 300 according to an embodiment of the present invention.

FIG. 14 is a block diagram illustrating an exemplary configuration of the electronic device 300 according to an embodiment of the present invention. In FIG. 14, the electronic device 300 of the present invention comprises a permission information storing section 301, an application executing section 302, a control section 303, a permission information receiving section 305, and a communication section 306. The permission information storing section 301 stores permission information received from the access control device 100. The permission information receiving section 305 receives permission information from the access control device 100 via the communication section 306. Note that the application executing section 302, the control section 303, and the communication section 306 have configurations similar to those of the electronic device 200 and will not be described.

Operations of the electronic device 200 and the electronic device 300 will be described. It is assumed that the electronic device 200 and the electronic device 300 are already executing an application which provides a desired service, in association with each other. Here, operations of the electronic device 200 and the electronic device 300 in the case where an application executed by the electronic device 200 requests access to the electronic device 300, will be described.

Figure 15:
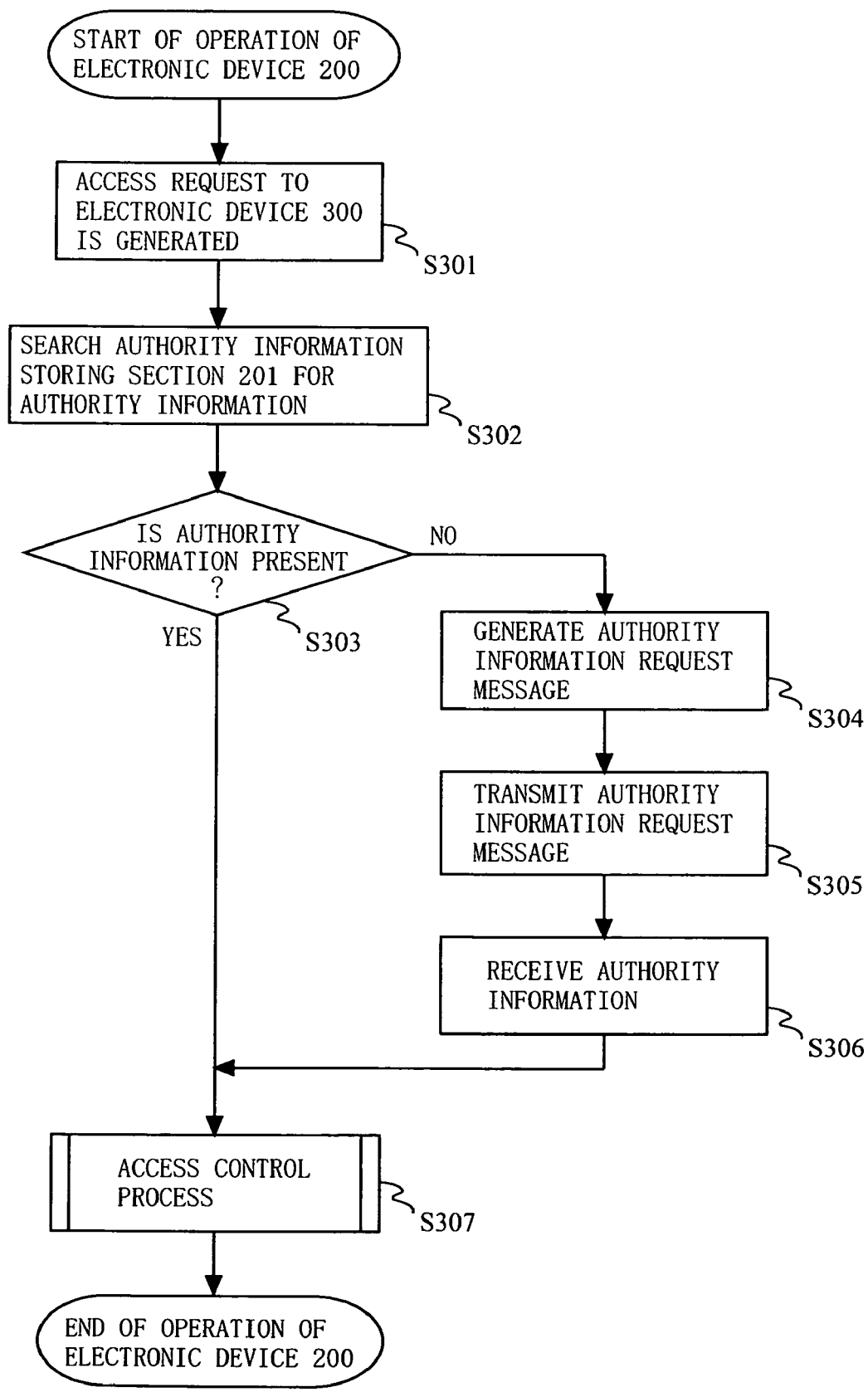
FIG. 15 is a flowchart illustrating an exemplary operation of the electronic device 200.

FIG. 15 is a flowchart illustrating an exemplary operation of the electronic device 200. Referring to FIG. 15, the application executing section 202 executes an application to generate a request for access to the electronic device 300 (step S301). The application executing section 202 inquires the control section 203 about the access request to the electronic device 300. When inquired about the access request, the control section 203 searches the authority information storing section 201 for authority information (step S302).

When authority information is not present in the authority information storing section 201, the control section 203 requests the authority information requesting section 204 to obtain authority information. When requested by the control section 203 to obtain authority information, the authority information requesting section 204 generates an authority information request message (see FIG. 9) which is a message for requesting authority information (steps S303 and S304). The authority information requesting section 204 transmits the generated authority information request message via the communication section 206 to the access control device 100 (step S305).

Next, the authority information receiving section 205 receives authority information via the communication section 206 from the access control device 100 (step S306). When receiving encrypted authority information, the authority information receiving section 205 performs a decoding process with respect to the encrypted authority information. The authority information receiving section 205 stores the received authority information into the authority information storing section 201 and also informs the control section 203 of the authority information. The control section 203 uses the received authority information or the authority information stored in the authority information storing section 201 to perform an access control process with respect to the electronic device 300 (step S307).

Figure 16:
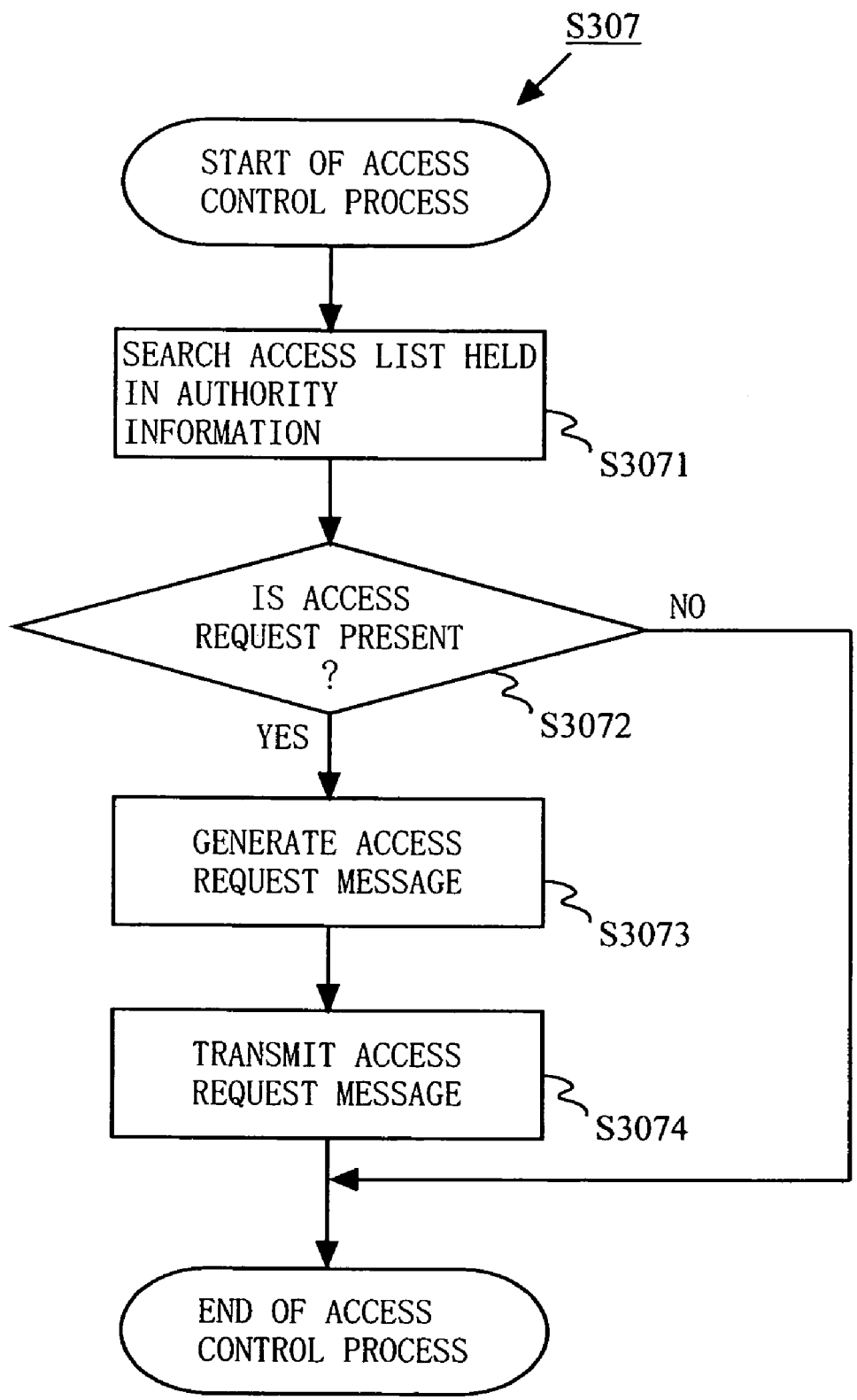
FIG. 16 is a flowchart illustrating an exemplary detailed operation of an access control process.

FIG. 16 is a flowchart illustrating an exemplary detailed operation of the access control process. Referring to FIG. 16, the control section 203 searches the access list (see FIG. 3) held in the authority information to check whether or not an access request generated by an application is present in the access list (step S3071).

The control section 203 ends the process if the access request is not present in the access list. On the other hand, when the access request is present in the access list, the control section 203 generates an access request message which requests access to the electronic device 300 (steps S3072 and S3073). The control section 203 transmits the generated access request message to request access to the electronic device 300 (S3074).

Figure 17:
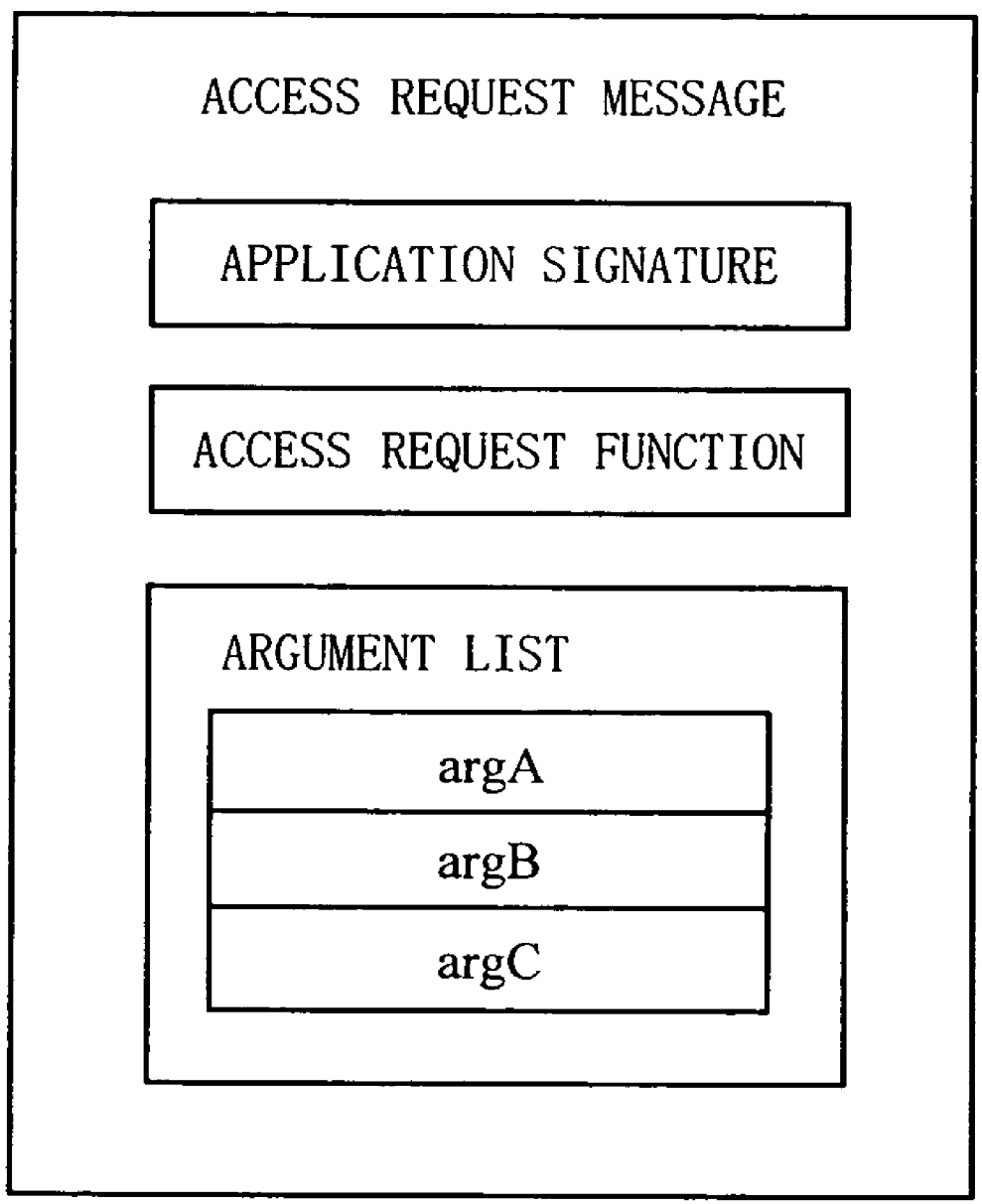
FIG. 17 is a diagram illustrating an exemplary structure of an access request message.

FIG. 17 is a diagram illustrating an exemplary structure of the access request message. Referring to FIG. 17, the access request message is composed of an application signature, an access request function, and an argument list. In the argument list, a plurality of arguments with respect to the access request function are stored. Here, the argument list holds argA, argB, and argC. The application signature is the result of signing the access request function and the argument list using an application secret key stored in authority information.

Figure 18:
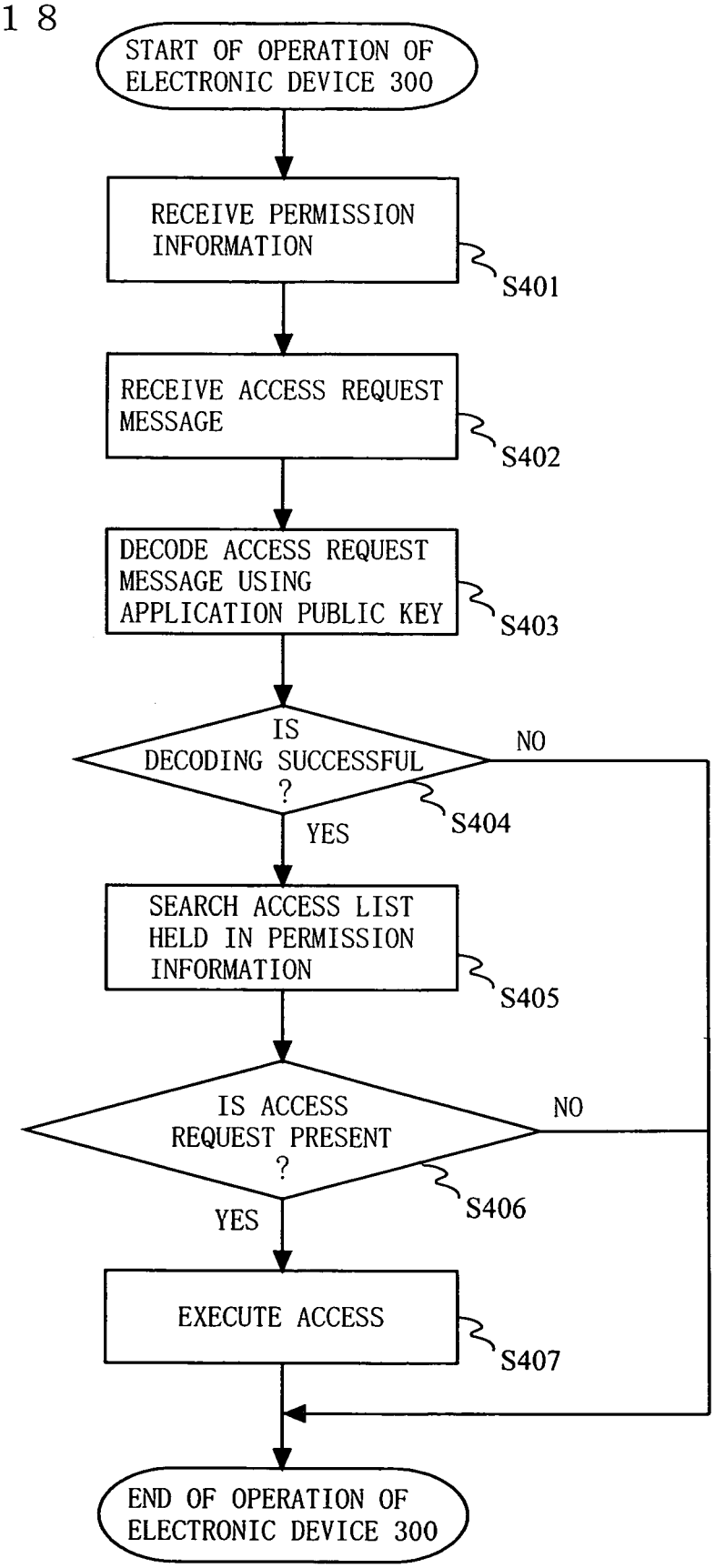
FIG. 18 is a flowchart illustrating an exemplary operation of the electronic device 300.
Figure 19:
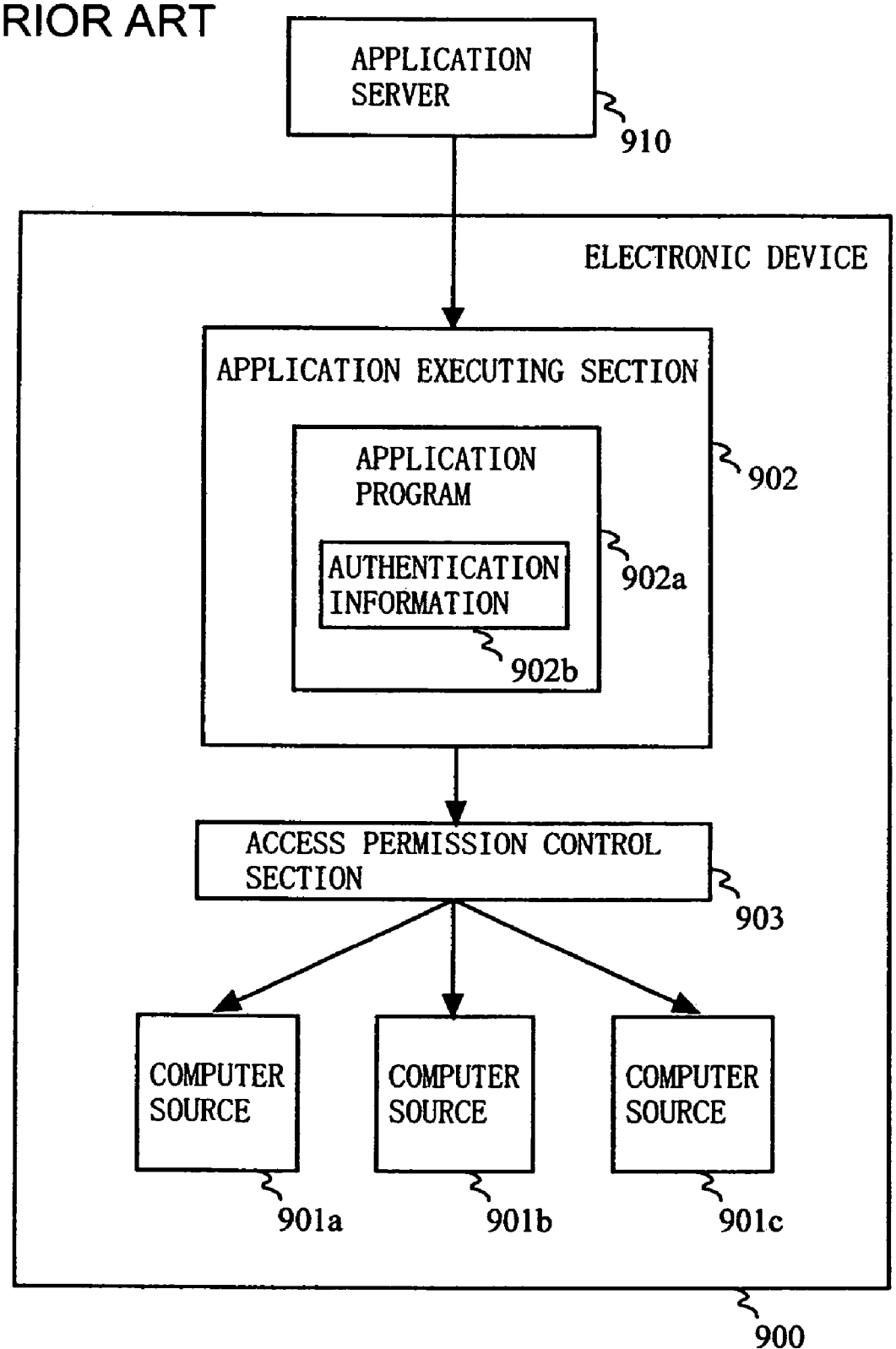
FIG. 19 is a block diagram illustrating an exemplary configuration of a conventional electronic device.

FIG. 18 is a flowchart illustrating an exemplary operation of the electronic device 300. Referring to FIG. 18, the permission information receiving section 305 receives via the communication section 306 permission information which is transmitted simultaneously with authority information from the access control device 100 (step S401). When receiving encrypted permission information, the permission information receiving section 305 performs a decoding process with respect to the encrypted permission information. The permission information receiving section 305 stores the received permission information into the permission information storing section 301 and also informs the control section 303 of the permission information.

The control section 303 receives an access request message via the communication section 306 from the electronic device 200 (step S402). The control section 303 decodes the received access request message using an application public key present in the permission information (step S403). When failing to decode the access request message, the control section 303 ends the process.

On the other hand, when being successful in decoding the access request message, the control section 303 searches an access list (see FIG. 5) held in the permission information to check whether or not the access request received from the electronic device 200 is present in the access list (step S404).

When the access request is not present in the access list, the control section 303 ends the process. On the other hand, when the access request is present in the access list, the control section 303 extracts an access request function and an argument list from the access request message (see FIG. 17), and executes access to the application executing section 302 (step S405).

An example in which the access control device 100, the electronic device 200 and the electronic device 300 of the present invention are applied to an application distribution type service, will be described. In this applied example, the electronic device 200 is assumed to be a device which downloads and executes an application from an application distribution server. The electronic device 300 is assumed to be the application distribution server. In such a case, the electronic device 200 can selectively download only an application corresponding to a function permitted by permission information, from the electronic device 200, based on authority information generated by the access control device 100. Thereby, the electronic device 200 can avoid downloading an application which includes execution which is not permitted.

Note that the electronic device 200 may further comprise the permission information storing section 301 and the permission information receiving section 305. Thereby, the electronic device 200 can achieve an operation similar to that of the electronic device 300. The electronic device 300 may further comprise the authority information storing section 201, the authority information requesting section 204, and the authority information receiving section 205. Thereby, the electronic device 300 can achieve an operation similar to that of the electronic device 200.

Note that the procedures of the access control device 100, the electronic device 200 and the electronic device 300 of the embodiment of the present invention may be implemented by a CPU interpreting and executing predetermined program data which can execute the above-described procedures which are stored in a storage device (a ROM, a RAM, a hard disk, etc.). In this case, the program data may be introduced via a storage medium to the storage device, or may be executed directly from the storage medium. Note that the storage medium refers to a semiconductor memory (a ROM, a RAM, a flash memory, etc.), a magnetic disk memory (e.g., a flexible disk, a hard disk, etc.), an optical disc memory (e.g., a CD-ROM, a DVD, a BD, etc.), a memory card, or the like. The storage medium has a concept including communication media (a telephone line, a transmission channel, etc.).

As described above, the access control device 100 of the present invention generates authority information and permission information in relation with each other, and transmits the generated authority information to the electronic device 200 which is to do access, and the permission information to the electronic device 300 which is to be accessed. Thereby, the access control device 100 can control an access right to a plurality of electronic devices present in a network for each combination of electronic devices.

Since the electronic device 200 of the present invention requests access to the electronic device 300 only when given authority according to authority information, it is possible to prevent request for access to an electronic device which is not given authority. Also, since the electronic device 300 permits access from the electronic device 200 only when permitted according to permission information, it is possible to prevent access from an electronic device which is not given permission. Thereby, the electronic device 200 and the electronic device 300 can provide a predetermined service in association with each other via a network while preventing unauthorized access.

The access control device of the present invention is effective for a control of an access right with respect to a plurality of electronic devices present in a network for each combination of electronic devices, for example.

The invention claimed is:

1. An access control device connected via a network to a plurality of electronic devices including a first electronic device and a second electronic device which execute a predetermined application in association with each other, the device comprising:

an authority information generating section for generating authority information which is information which defines authority with which the first electronic device requests access to the second electronic device, wherein the authority information includes an application secret key generated corresponding to an application executed by the first electronic device, and an access list which lists a function of the application given authority for accessing the second electronic device;

a permission information generating section for generating permission information which is information for determining whether or not the second electronic device gives access permission to the access request based on the authority information from the first electronic device, in relation with the authority information, wherein the permission information includes an application public key generated in a pair with the application secret key, and the access list;

a communication section for communicating with the plurality of electronic devices via the network;

a reception control section for receiving a request for generation of the authority information via said communication section from the first electronic device, and instructing said authority information generating section to generate the authority information;

an access information storing section for storing the authority information and the permission information; and a transmission control section for transmitting, via said communication section, the authority information to the first electronic device and the permission information to the second electronic device.

2. The access control device according to claim 1, further comprising:

a policy information storing section for storing a policy for determining whether or not generation of the authority information is permitted with respect to the request for generation of the authority information from the first electronic device; and a policy determining section for determining whether or not the authority information is generated, based on the policy stored in said policy information storing section, wherein said reception control section, when receiving the request for generation of the authority information, inquires said policy determining section whether or not generation of the authority information is permitted; and only when said policy determining section determines that generation of the authority information is permitted, said reception control section instructs said authority information generating section to generate the authority information.

3. The access control device according to claim 1, wherein said authority information generating section generates authority information which is signed using a secret key possessed by the authority information generation itself.

4. The access control device according to claim 1, wherein said permission information generating section generates permission information which is signed using a secret key possessed by said permission information generating section itself.

5. In a network composed of a plurality of electronic devices and an access control device, an electronic device for executing a predetermined application in association with another electronic device, the electronic device comprising:

a communication section for communicating with the plurality of electronic devices and the access control device via the network;

a permission information receiving section for receiving permission information which is information for determining whether or not access permission is given to an access request from the other electronic device, via said communication section, from the access control device, wherein the permission information includes an application secret key generated corresponding to an application executed by the other electronic device, and an access list which lists a function of the application which permits the access request from the other electronic device;

a permission information storing section for storing the permission information received by said permission information receiving section;

an application executing section for executing the predetermined application; and a control section for controlling the access request to said application executing section from the other electronic device, wherein said control section determines whether or not the access request from the other electronic device is permitted, based on the permission information stored in the permission information.

6. The electronic device according to claim 5, wherein said control section permits the access request from the other electronic device only when a function corresponding to the access request from the other electronic device is included in the access list.

7. An access control method performed by an access control device connected via a network to a plurality of electronic devices including a first electronic device and a second electronic device which execute a predetermined application in association with each other, the method comprising the steps of:

generating authority information which is information which defines authority with which the first electronic device requests access to the second electronic device, wherein the authority information includes an application secret key generated corresponding to an application executed by the first electronic device, and an access list which lists a function of the application given authority for accessing the second electronic device;

generating permission information which is information for determining whether or not the second electronic device gives access permission to the access request based on the authority information from the first electronic device, in relation with the authority information;

communicating with the plurality of electronic devices via the network;

receiving a request for generation of the authority information via the communicating step from the first electronic device;

instructing the authority information generating step to generate the received authority information; and transmitting the authority information to the first electronic device and the permission information to the second electronic device.

8. In a network composed of a plurality of electronic devices and an access control device, a method with which an electronic device for executing a predetermined application in association with another electronic device, determines whether or not to permit an access request from the other electronic device, the method comprising the steps of:

communicating with the plurality of electronic devices and the access control device via the network;

receiving, via the communicating step, permission information which is information for determining whether or not access permission is given to the access request from the other electronic device, wherein the permission information includes an application secret key generated corresponding to an application executed by the other electronic device, and an access list which lists a function of the application which permits the access request from the other electronic device;

executing the predetermined application; and determining whether or not the access request from the other electronic device is permitted, based on the permission information.

9. A program stored on a computer-readable storage medium executed by an access control device connected via a network to a plurality of electronic devices including a first electronic device and a second electronic device which execute a predetermined application in association with each other, the program causing a computer to execute the steps of:

generating authority information which is information which defines authority with which the first electronic device requests access to the second electronic device, wherein the authority information includes an application secret key generated corresponding to an application executed by the first electronic device, and an access list which lists a function of the application given authority for accessing the second electronic device;

generating permission information which is information for determining whether or not the second electronic device gives access permission to the access request based on the authority information from the first electronic device, in relation with the authority information;

communicating with the plurality of electronic devices via the network;

receiving a request for generation of the authority information via the communicating step from the first electronic device;

instructing the authority information generating step to generate the received authority information; and transmitting the authority information to the first electronic device and the permission information to the second electronic device.

10. In a network composed of a plurality of electronic devices and an access control device, a program stored on a computer-readable storage medium executed by an electronic device for executing a predetermined application in association with another electronic device, the program causing a computer to execute the steps of:

communicating with the plurality of electronic devices and the access control device via the network;

receiving permission information which is information for determining whether or not access permission is given to the access request from the other electronic device, via the communicating step, from the access control device, wherein the permission information includes an application secret key generated corresponding to an application executed by the other electronic device, and an access list which lists a function of the application which permits the access request from the other electronic device;

executing the predetermined application; and determining whether or not the access request from the other electronic device is permitted, based on the permission information.

* * * * *